United States Patent
Laitila et al.

(10) Patent No.: US 11,711,718 B2
(45) Date of Patent: Jul. 25, 2023

(54) COMMUNICATION EFFICIENCY

(71) Applicant: NOKIA TECHNOLOGIES OY, Espoo (FI)

(72) Inventors: Matti Laitila, Oulu (FI); Philippe Godin, Versailles (FR); Benoist Sebire, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/949,404

(22) Filed: Oct. 28, 2020

(65) Prior Publication Data

US 2021/0136620 A1  May 6, 2021

Related U.S. Application Data

(60) Provisional application No. 62/929,757, filed on Nov. 1, 2019.

(51) Int. Cl.
*H04W 28/02* (2009.01)
*H04W 28/06* (2009.01)
(Continued)

(52) U.S. Cl.
CPC ....... *H04W 28/0268* (2013.01); *H04W 28/06* (2013.01); *H04W 28/10* (2013.01); *H04W 76/27* (2018.02)

(58) Field of Classification Search
CPC . H04W 28/0268; H04W 28/06; H04W 76/27; H04W 28/10
See application file for complete search history.

(56) References Cited

U.S. PATENT DOCUMENTS 10,917,821 B2 * 2/2021 Yang ................. H04W 36/0083
2009/0156219 A1 * 6/2009 Kim ...................... H04W 36/26
455/442

(Continued)

FOREIGN PATENT DOCUMENTS

WO  WO-2021028053 A1 *  2/2021  ........ H04W 36/0044
WO  WO-2021053006 A1 *  3/2021

OTHER PUBLICATIONS

3GPP TSG SA WG3 Meeting #134, S2-1908223; "Enhancements to QoS Handling for V2X Communication Over Uu Reference Point"; Sapporo, Japan; Jun. 24-28, 2019; 5 pages.
(Continued)

*Primary Examiner* — Parth Patel
(74) *Attorney, Agent, or Firm* — Brake Hughes Bellermann LLP

(57) ABSTRACT

There is provided a method at a first network node, comprising: receiving, from a second network node, a message comprising a requested quality of service (QoS) profile and one or more alternative QoS profiles, wherein the QoS profiles are associated with a communication with a user equipment; determining that the requested QoS profile cannot be provided by the first network node for a communication between the first network node and the user equipment; determining that at least one of the one or more alternative QoS profiles can be provided by the first network node for a communication between the first network node and the user equipment; transmitting, to the second network node, an indication that an alternative QoS profile can be provided by the first network node; and, transmitting, to the second network node, an indication for configuring the user equipment based on the requested QoS profile.

20 Claims, 5 Drawing Sheets

(51) Int. Cl.
*H04W 76/27* (2018.01)
*H04W 28/10* (2009.01)

(56) References Cited

U.S. PATENT DOCUMENTS

| | | | | |
|---|---|---|---|---|
| 2014/0341189 | A1* | 11/2014 | Yang | H04L 1/1822 |
| | | | | 370/331 |
| 2016/0262066 | A1* | 9/2016 | Ozturk | H04W 74/0833 |
| 2017/0070926 | A1* | 3/2017 | Frenger | H04W 24/02 |
| 2020/0337108 | A1* | 10/2020 | Wu | H04W 48/20 |
| 2021/0136620 | A1* | 5/2021 | Laitila | H04W 76/27 |
| 2022/0053364 | A1* | 2/2022 | Kim | H04W 28/24 |
| 2022/0167217 | A1* | 5/2022 | Wei | H04W 28/0268 |
| 2022/0295338 | A1* | 9/2022 | Ebrahim Rezagah | H04W 28/24 |

OTHER PUBLICATIONS

3GPP TSG-RAN WG3 #105bis, R3-195164; "Enhancements of QoS recovery"; Chongqing, China; Oct. 14-18, 2019; 4 pages.

3GPP TSG-RAN WG3 #105bis, R3-195166; "Enhancement of QoS recovery"; Chongqing, China; Oct. 14-18, 2019; 5 pages.

3GPP TSG-RAN WG3 Meeting #105, R3-194745; "Summary of offline for alternative QoS profiles"; Ljubljana, Slovenia; Aug. 25-30, 2019; 3 pages.

3GPP TSG-RAN3 Meeting #105, R3-193337; "Summary of offline for alternative QoS profiles"; Ljubljana, Slovenia, Aug. 26-30, 2019; 2 pages.

\* cited by examiner

COMMUNICATION EFFICIENCY

PRIORITY CLAIM

This application claims priority to U.S. Provisional Patent Application No. 62/929,757, filed Nov. 1, 2019, entitled "Improving Communication Efficiency," which is hereby incorporated by reference in its entirety.

TECHNICAL FIELD

Various example embodiments relate generally to improving communication efficiency.

BACKGROUND

It may be important to provide appropriate quality of service (QoS) for a communication between a base station and a user equipment. Sometimes meeting the requested QoS may not be possible. How to handle such situations is not clear.

BRIEF DESCRIPTION

According some aspects, there is provided the subject matter of the independent claims. Some further aspects are defined in the dependent claims. The embodiments that do not fall under the scope of the claims are to be interpreted as examples useful for understanding the disclosure.

BRIEF DESCRIPTION OF THE DRAWINGS

In the following, the invention will be described in greater detail with reference to the embodiments and the accompanying drawings, in which.

DETAILED DESCRIPTION

Figure 1:
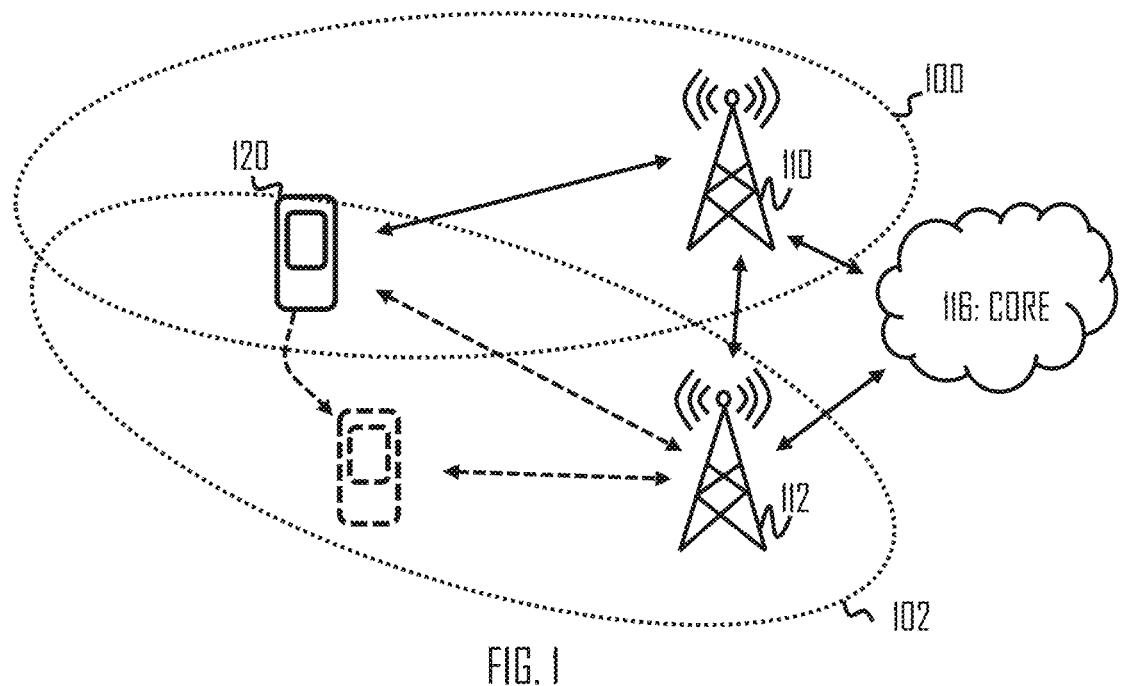
FIG. 1 presents a communication network, according to an embodiment.

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

Embodiments described may be implemented in a radio system, such as one comprising at least one of the following radio access technologies (RATs): Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and enhanced LTE (eLTE). Term 'eLTE' here denotes the LTE evolution that connects to a 5G core. LTE is also known as evolved UMTS terrestrial radio access (EUTRA) or as evolved UMTS terrestrial radio access network (EUTRAN). A term "resource" may refer to radio resources, such as a physical resource block (PRB), a radio frame, a subframe, a time slot, a sub-band, a frequency region, a sub-carrier, a beam, etc. The term "transmission" and/or "reception" may refer to wirelessly transmitting and/or receiving via a wireless propagation channel on radio resources.

The embodiments are not, however, restricted to the systems/RATs given as an example but a person skilled in the art may apply the solution to other communication systems provided with necessary properties. One example of a suitable communications system is the 5G system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in cooperation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integrable with existing legacy radio access technologies, such as the LTE.

The current architecture in LTE networks is distributed in the radio and centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications). Edge cloud may be brought into RAN by utilizing network function virtualization (NVF) and software defined networking (SDN). Using edge cloud may mean access node operations to be carried out, at least partly, in a server, host or node operationally coupled to a remote radio head or base station comprising radio parts. Network slicing allows multiple virtual networks to be created on top of a common shared physical infrastructure.

The virtual networks are then customized to meet the specific needs of applications, services, devices, customers or operators.

In radio communications, node operations may in be carried out, at least partly, in a central/centralized unit, CU, (e.g., server, host or node) operationally coupled to distributed unit, DU, (e.g., a radio head/node). It is also possible that node operations will be distributed among a plurality of servers, nodes or hosts. It should also be understood that the distribution of labor between core network operations and base station operations may vary depending on implementation. Thus, 5G networks architecture may be based on a so-called CU-DU split. One gNB-CU controls several gNB-DUs. The term 'gNB' may correspond in 5G to the eNB in LTE. The gNBs (one or more) may communicate with one or more UEs 120. The gNB-CU (central node) may control a plurality of spatially separated gNB-DUs, acting at least as transmit/receive (Tx/Rx) nodes. In some embodiments, however, the gNB-DUs (also called DU) may comprise e.g., a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer.

In an embodiment, the server or CU may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Some other technology advancements probably to be used are Software-Defined Networking (SDN), Big Data, and all-IP, to mention only a few non-limiting examples. For example, network slicing may be a form of virtual network architecture using the same principles behind software defined networking (SDN) and network functions virtualization (NFV) in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customized to meet the specific needs of applications, services, devices, customers or operators.

The plurality of gNBs (access points/nodes), each comprising the CU and one or more DUs, may be connected to each other via the Xn interface over which the gNBs may negotiate. The gNBs may also be connected over next generation (NG) interfaces to a 5G core network (5GC), which may be a 5G equivalent for the core network of LTE. Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RANs. Furthermore, it may be possible to have configurations where the full protocol stack is controlled by the same HW and handled by the same radio unit as the CU.

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced Machine-Type Communication). NB-IoT focuses specifically on low cost, long battery life, and enabling a large number of connected devices. The NB-IoT technology is deployed "in-band" in spectrum allocated to Long Term Evolution (LTE)-using resource blocks within a normal LTE carrier, or in the unused resource blocks within a LTE carrier's guard-band—or "standalone" for deployments in dedicated spectrum.

The embodiments may be also applicable to device-to-device (D2D), machine-to-machine, peer-to-peer (P2P) communications. The embodiments may be also applicable to vehicle-to-vehicle (V2V), vehicle-to-infrastructure (V2I), infrastructure-to-vehicle (I2V), or in general to V2X or X2V communications.

FIG. 1 illustrates an example of a communication system to which embodiments of the invention may be applied. The system may comprise a control node 110 providing one or more cells, such as cell 100, and a control node 112 providing one or more other cells, such as cell 102. Each cell may be, e.g., a macro cell, a micro cell, femto, or a pico cell, for example. In another point of view, the cell may define a coverage area or a service area of the corresponding access node. The control node 110, 112 may be an evolved Node B (eNB) as in the LTE and LTE-A, ng-eNB as in eLTE, gNB of 5G, or any other apparatus capable of controlling radio communication and managing radio resources within a cell.

The control node 110, 112 may be called a base station, network node, or an access node, for example.

The system may be a cellular communication system composed of a radio access network of access nodes, each controlling a respective cell or cells. The access node 110 may provide user equipment (UE) 120 (one or more UEs) with wireless access to other networks such as the Internet. The wireless access may comprise downlink (DL) communication from the control node to the UE 120 and uplink (UL) communication from the UE 120 to the control node.

Additionally, although not shown, one or more local area access nodes may be arranged such that a cell provided by the local area access node at least partially overlaps the cell of the access node 110 and/or 112. The local area access node may provide wireless access within a sub-cell. Examples of the sub-cell may include a micro, pico and/or femto cell. Typically, the sub-cell provides a hot spot within a macro cell. The operation of the local area access node may be controlled by an access node under whose control area the sub-cell is provided. In general, the control node for the small cell may be likewise called a base station, network node, or an access node.

There may additionally be a plurality of UEs 120 in the system. Each of them may be served by the same or by different control nodes 110, 112. The UEs may communicate with each other, in case D2D communication interface is established between them.

The term "terminal device" or "UE" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In the case of multiple access nodes in the communication network, the access nodes may be connected to each other with an interface. LTE specifications call such an interface as X2 interface. For IEEE 802.11 network (i.e., wireless local area network, WLAN, WiFi), a similar interface Xw may be provided between access points. An interface between an eLTE access point and a 5G access point, or between two 5G access points may be called Xn. Other communication methods between the access nodes may also be possible. The access nodes 110 and 112 may be further connected via another interface to a core network 116 of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and there the core network may comprise e.g., an access and mobility management function (AMF) and a user plane function/gateway (UPF), to mention only a few. The AMF may handle termination of non-access stratum (NAS) signalling, NAS ciphering & integrity protection, registration management, connection management, mobility management, access authentication and authorization, security context management. The UPF node may support packet routing & forwarding, packet inspection and QoS handling, for example.

The concept of QoS in 4G LTE is based on bearers. An LTE bearer is a transmission path through the infrastructure and radio interface with a defined capacity, latency and packet loss.

Unlike in previous generations, there is no one-to-one mapping between radio access bearers (RABs) from the core network and radio bearers (RBs) in the RAN. In 5G, the QoS model is not based on RABs but on QoS flows. The 5G QoS model gives a greater freedom to the RAN: 5GC only marks packets with a QoS Flow ID (QFI) and the RAN is entrusted to use that information for configuring and selecting appropriate DRBs for the QoS flows.

Figure 2:
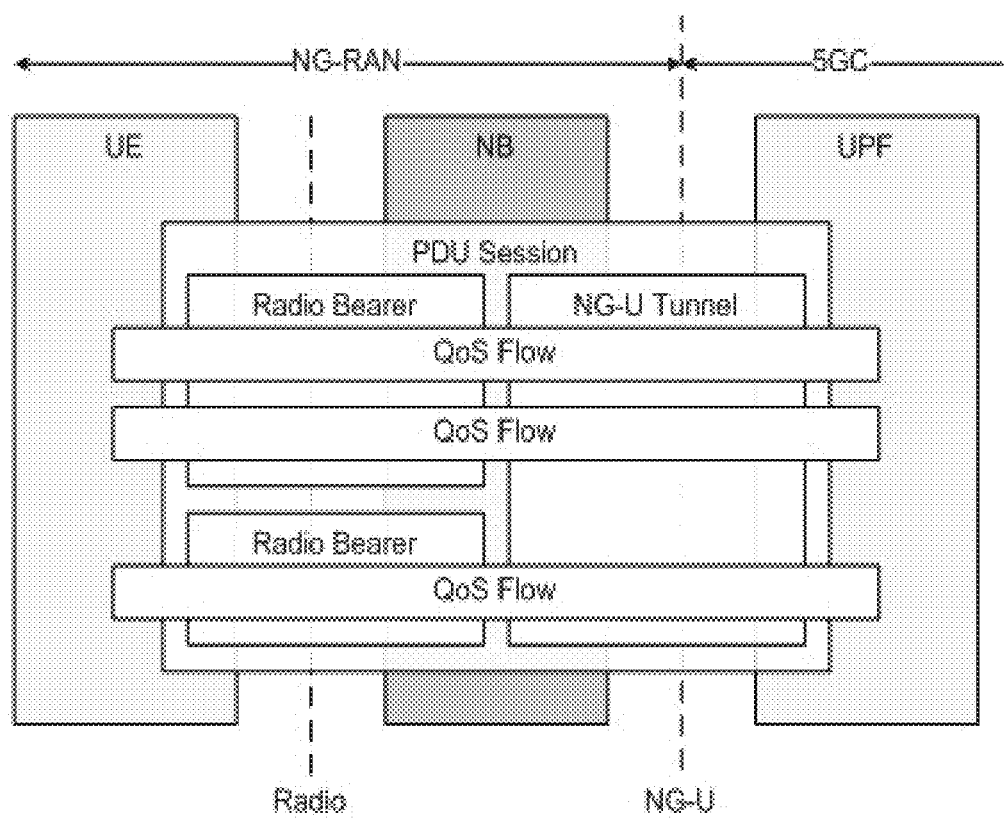
FIG. 2 shows a quality of service handling in New Radio, according to an embodiment.

FIG. 2 depicts 5G QoS architecture and various elements. For 5G, QoS flow is identified by QFI within a packet data unit (PDU) session. This QFI may be carried over NG-U from UPF to gNB (marked as NB in the figure). For each UE, 5GC establishes one or more PDU sessions and NG-RAN establishes at least one data radio bearer (DRB) together with a PDU session. Additional DRB(s) for QoS flow(s) of that PDU session can be subsequently configured (it may be up to NG-RAN when to do so). NG-RAN maps packets which belong to the different PDU sessions to different DRBs. Non-access stratum (NAS) level packet filters in the UE and in the 5GC associate uplink/downlink (UL/DL) packets with QoS flows. At NAS level, QoS flow is characterized by QoS profile provided by 5GC to NG-RAN and QoS rules provided by 5GC to UE. The QoS profile is used by NG-RAN to determine the treatment on the radio interface while the QoS rules dictates the mapping between uplink User Plane traffic and QoS flows to the UE.

Access stratum (AS)-level mapping rules in the UE and in the NG-RAN associate UL/DL QoS flows with DRBs. At access stratum (AS) level, the data radio bearer (DRB) defines the packet treatment on the radio interface (Uu). A DRB serves packets with the same packet forwarding treatment. The QoS flow to DRB mapping by NG-RAN is based on QFI and the associated QoS profiles (i.e., QoS parameters and QoS characteristics). Separate DRBs may be established for QoS flows requiring different packet forwarding treatment, or several QoS Flows belonging to the same PDU session can be multiplexed in the same DRB. In the uplink, the mapping of QoS Flows to DRBs is controlled by mapping rules which may be signalled in two different ways:

Reflective mapping: for each DRB, the UE monitors the QFI(s) of the downlink packets and applies the same mapping in the uplink; that is, for a DRB, the UE maps the uplink packets belonging to the QoS flows(s) corresponding to the QFI(s) and PDU Session observed in the downlink packets for that DRB. To enable this reflective mapping, the NG-RAN marks downlink packets over Uu with QFI.

Explicit Configuration: QoS flow to DRB mapping rules can be explicitly signalled by RRC.

The UE may apply (e.g., always apply) the latest update of the mapping rules regardless of whether it is performed via reflecting mapping or explicit configuration. When a QoS flow to DRB mapping rule is updated, the UE sends an end marker on the old bearer.

Therefore, NG-RAN and 5GC ensure quality of service (e.g., reliability and target delay) by mapping packets (IP flows) to appropriate QoS Flows and DRBs. Hence there is a 2-step mapping of IP-flows to QoS flows (NAS) and from QoS flows to DRBs (AS).

A QoS profile may comprise QoS parameters, such as 5QI (5G QoS Identifier) and/or allocation and retention priority (ARP). For guaranteed bit rate (GBR) QoS flow the parameters may comprise e.g., GFBR (Guaranteed Flow Bit Rate), MFBR (Maximum Flow Bit Rate) and/or a maximum packet loss rate for both uplink and downlink. For Non-GBR QoS, the parameters may comprise e.g., reflective QoS attribute (RQA). QoS characteristics, which describe packet forwarding treatment that a QoS Flow receives edge-to-edge between the UE and the UPF, may comprise e.g., one or more of the following: the following parameters: resource type (GBR, delay critical GBR or non-GBR), priority level, packet delay budget, packet error rate, averaging window, maximum data burst volume.

A QoS Parameter Notification control indicates whether notifications are requested from the NG-RAN when the GFBR can no longer (or can again) be guaranteed for a QoS Flow during the lifetime of the QoS Flow. Notification control may be used for a GBR QoS Flow if the application traffic is able to adapt to the change in the QoS (e.g., if the AF is capable to trigger rate adaptation). The Notification control parameter is signalled to the NG-RAN as part of the QoS profile. If, for a given GBR QoS Flow, Notification control is enabled and the NG-RAN determines that the GFBR can no longer be guaranteed, NG-RAN shall send a notification towards SMF and keep the QoS Flow (i.e., while the NG-RAN is not delivering the requested GFBR for this QoS Flow), unless specific conditions at the NG-RAN require release of the NG-RAN resources for this GBR QoS Flow, e.g., due to Radio link failure or RAN internal congestion. The NG-RAN should try to guarantee the GFBR again. When the NG-RAN determines that the GFBR can be guaranteed again for a QoS Flow (for which a notification that the GFBR can no longer be guaranteed has been sent), the NG-RAN shall send a notification, informing the SMF that the GFBR can be guaranteed again. The NG-RAN shall send a subsequent notification that the GFBR can no longer be guaranteed whenever necessary.

3GPP has agreed a concept of alternative QoS profiles. The Alternative QoS Profile(s) can be optionally provided for a GBR QoS Flow with Notification control enabled. If the corresponding rule contains the related information (as described in TS 23.503 [45]), the SMF shall provide, in addition to the QoS profile, the Alternative QoS Profile(s) to the NG-RAN. An Alternative QoS profile represents a combination of QoS parameters and has the same format as the (desired) requested? QoS profile for that QoS Flow. When the NG-RAN sends a notification to the SMF that the requested QoS profile cannot be guaranteed, the NG-RAN may include the reference to the Alternative QoS profile(s) to indicate which (if any) of the Alternative QoS profiles that the NG-RAN can guarantee.

However, it is not decided how the RAN should behave when it cannot fulfil the requirements of the desired (a.k.a. requested) QoS (a.k.a. QoS profile). Thus, some embodiments relate to a QoS management by a RAN node and, more precisely, to QoS recovery to a desired level after a RAN node has temporarily had to downgrade QoS to lower level e.g., due to radio resource shortage. The 5G QoS model is specified from the system perspective in TS 23.501 and from RAN perspective in TS 38.300.

To at least partially tackle these uncertainties there is proposed a solution for handling of the alternative QoS profiles of a QoS flow in NG-RAN, which solution aims at signalling reduction and faster QoS recovery. This may be due to preparing the UE for the requested QoS e.g., in connection of handover by the target RAN node, even if the target RAN node is not able to support requested QoS at the time of handover being requested.

Figure 3:
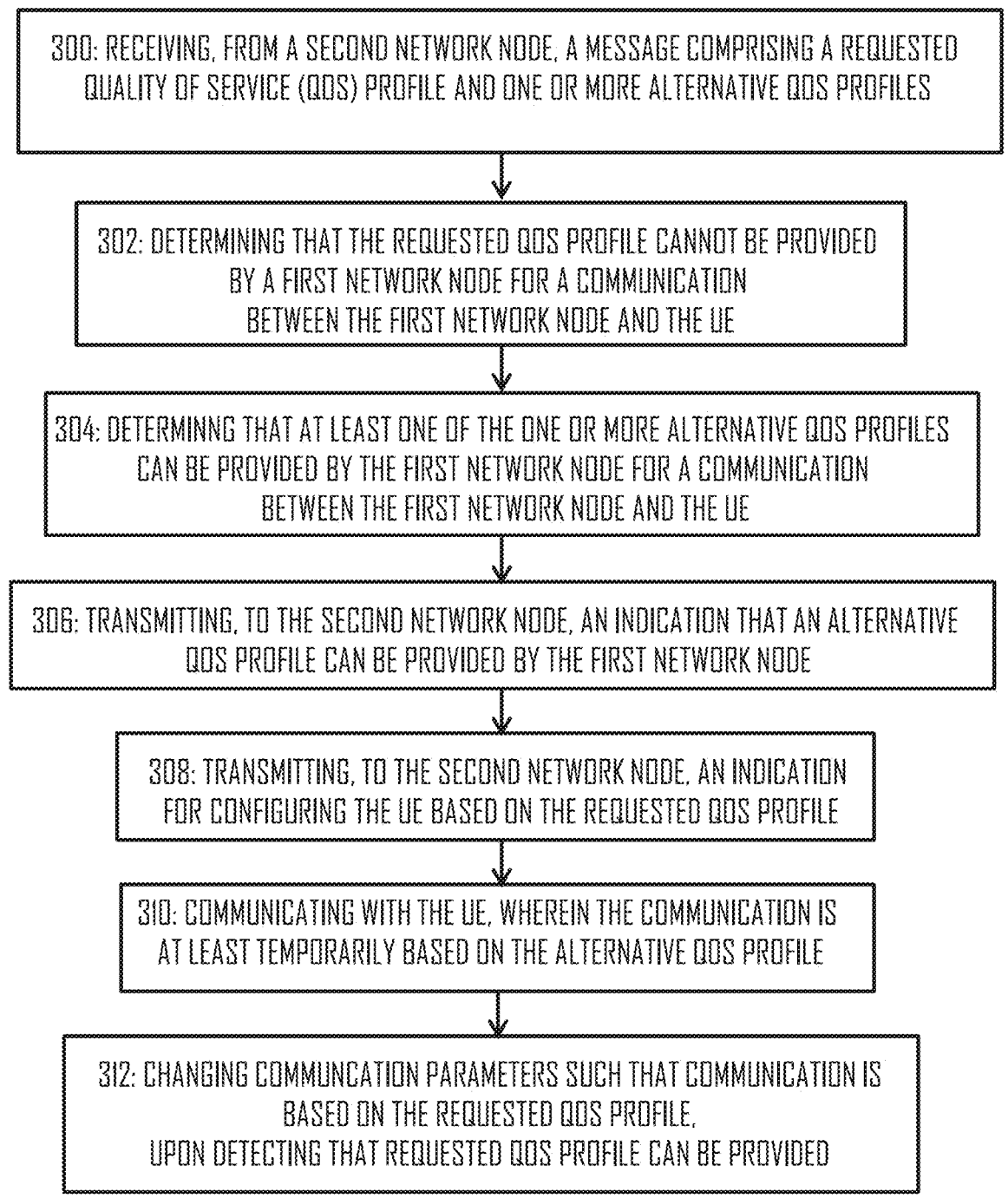
FIG. 3 shows a method, according to an embodiment.

FIG. 3 depicts an example method. The method may be performed by a radio access node, such as the node 112 of FIG. 1. For the sake of simplicity, let us assume that the node 112 is a gNB. Similarly, although applicable to many networks, we will in the following examples focus on 5G, for the sake of simplicity.

As shown in FIG. 3, the gNB 112 (called a first network node in FIG. 3) may in step 300 control receiving, from a second network node (such as the gNB 110), a (first) message comprising a requested QoS profile and one or more alternative QoS profiles. These QoS profiles are associated with a communication to/from a UE (such as UE 120 of FIG. 1). In other words, the gNB 112 is being asked by the gNB 110 whether the gNB 112 is able to communicate with the UE 120 preferably with the requested QoS, but if that is not possible, then based on one of the alternative QoS profiles. The requested and alternative QoS profiles may be known to the second network node 110 based on QoS flow information from the 5GC 116, for example. The QoS profiles may, as explained above, describe parameters for communications, such as what the guaranteed bit rate (GBR) should be. GBR may be also called as the GFBR. As one example, the requested QoS profile may require a higher GBR than the alternative QoS profile(s). In case there are many alternative QoS profiles, then these QoS profiles may vary in required GBRs. It needs to be noted that GBR is just one example parameter that can vary between different QoS profiles. In general, any of the above-mentioned QoS parameters and/or QoS characteristics may vary between different QoS profiles. However, for simplicity, let us use GBR as an example on how the QoS profiles may differ from each other.

In step 302, the gNB 112 may determine that the requested QoS profile cannot be provided by the gNB 112 for a communication between the gNB 112 and the UE 120. In step 304, the gNB 112 may determine that at least one of the one or more alternative QoS profiles can be provided by the gNB 112 for a communication between the gNB 112 and the UE 120. For example, the GBR of the requested QoS profile may be too high to be provided by the gNB 112. However, at least one of the GBRs of the alternative QoS profiles may be such that the gNB 112 can provide that to the UE 120. Whether the gNB 112 is able to provide the GBR, and consequently the corresponding QoS profile, may depend on e.g., on radio resource availability or channel conditions between the gNB 112 and the UE 120. As an example, if the gNB 112 does not have enough radio resources available (due to current load at the gNB 112) at the time of receiving the request, the gNB 112 may not be able to accept the requested QoS profile.

In step 306, the gNB 112 may transmit, to the requesting gNB 110, an indication that an alternative QoS profile can be provided by the gNB 112. It may be noted that the gNB 112 may determine that there are many QoS profiles the gNB 112 is able to provide to the UE 120, but the gNB 112 may select one of those. This selected alternative QoS profile which is identified to the gNB 110 via the indication may, in an embodiment, be the QoS profile of the one or more alternative QoS profiles which has the highest GBR.

In step 308, the gNB 112 may transmit, to the gNB 110, an indication for configuring the relevant UE 120 based on the requested QoS profile, even if the gNB 112 can only currently support the QoS profile (e.g., GBR) of one of the alternative QoS profiles at this time. This indication for configuring the UE 120 may comprise QoS parameters defined based on the requested QoS. For example, the logical channel priority (LCP) parameters (priority, prioritized bit rate, bucket size duration, etc.) may be defined based on the GBR of the requested QoS profile. In an embodiment, the indication (from the gNB 112 to the gNB 110) for configuring the UE 120 based on the requested QoS profile causes the gNB 110 to transmit or forward the indication to the UE 120 in a radio resource control (RRC) configuration message (such as in as RRC reconfiguration message). That is, the gNB 112 may generate the RRC reconfiguration message and send it to the UE 120 via the gNB 110.

In an embodiment, the indications of step 306 and 308 to the gNB 110 are comprised in one message. Let us call this the second message, as the message of step 300 may be called the first message.

In step 310, the gNB 112 may control communication with the UE 120, wherein the communication is at least temporarily based on the alternative QoS profile. Thus, the gNB 112 may send and/or transmit data to/from the UE 120 based on the GBR of the selected alternative QoS profile, although the UE 120 is configured with the requested (possibly higher) GBR. This may comprise the gNB 112 scheduling based on the GBR of the currently applied alternative QoS profile, for example. It needs to be noted that the UE 120 may communicate with degraded communication parameters although it has been configured for the parameters corresponding to the requested QoS profile. The UE 120 need not know that the gNB 112 is acting based on the alternative QoS profile. The communication parameters may be based on the relevant QoS profile and define e.g., the LCP parameters. It may be beneficial that the gNB 112 (RAN node) immediately starts to use the selected alternative QoS profile, since the alternative of an end-to-end PDU session modification signalling is avoided in QoS downgrade and QoS recovery to initial level.

In step 312, the gNB 112 may later determine that the requested QoS profile can be provided by the gNB 112 for the communication between the gNB 112 and the UE 120. This may be due to better resource availability or changed channel conditions between the gNB 112 and the UE 120, for example. As a consequence, the gNB 112 may change the communication parameters such that the communication is or will be based on the requested QoS profile (and the GBR of it, for example). This can be done without any further configuration messages to the UE 120, since the UE 120 is already configured with the requested QoS profile with higher GBR, for example. Thus, there may not be any need for sending a new RRC reconfiguration indication to the UE 120 due to the change of the communication parameters.

In another embodiment of step 312, the gNB 112 may determine that currently used alternative QoS profile cannot be anymore provided by the gNB 112 for the communication between the gNB 112 and the UE 120. This may be due to changed resource availability in gNB 112 or channel conditions between the gNB 112 and the UE 120, for example. As a consequence, the gNB 112 may change the communication parameters such that the communication is or will be based on another one of the one or more alternative QoS profiles (and the GBR of it, for example). This can be done without any further configuration messages to the UE 120, since the UE 120 is already configured with the requested QoS profile with the higher GBR, and can also handle degraded GBR from the gNB 112, for example. The gNB 112 may take the (possibly even lower) GBR of the other alternative QoS profile into use for the communication between the gNB 112 and the UE 120. Thus, there may not be any need for sending a new RRC reconfiguration indication to the UE 120 due to the change of the communication parameters.

In yet another embodiment of step 312, the gNB 112 may determine that currently used requested QoS profile cannot be anymore provided by the gNB 112 for the communication between the gNB 112 and the UE 120. This may be due to changed resource availability in gNB 112 or channel conditions between the gNB 112 and the UE 120, for example. As a consequence, the gNB 112 may change the communication parameters such that the communication is or will be based on one of the one or more alternative QoS profiles (and the GBR of it, for example). This can be done without any further configuration messages to the UE 120, since the UE 120 is already configured with the requested QoS profile with the higher GBR and can also handle degraded GBR from the gNB 112, for example. Thus, there may not be any need for sending a new RRC reconfiguration indication to the UE 120 due to the change of the communication parameters.

In an embodiment, the gNB 112 or the gNB 110 may inform the core network 116 about the QoS profile that is to be or is being used for the communication between the gNB 112 and the UE 120. The QoS profile may be e.g., the alternative QoS profile in the beginning and then later on when channel conditions or resource availability so allow, the requested QoS profile. The gNB 112 or the gNB 110 may in an embodiment indicate to the core network 116 the change in the QoS profile being used.

One of open issues identified in connection of QoS management is the behavior of the target gNB at a handover, when the target gNB is not able to support the requested QoS. For example, at handover to a target gNB that cannot support the requested QoS, should the target gNB prepare a radio resource configuration (RRC) handover command for an alternative QoS profile, or, prepare an RRC-handover command that deactivates/releases the requested QoS flow and associated bearers? The problem with these two envisaged solutions may be that when the target gNB is able to recover to the requested QoS, then access stratum signalling to the UE 120 is at minimum required to modify the DRB carrying the QoS flow to now support the requested QoS. In addition, if the QoS is changed always through the PDU session modification procedure, then end-to-end signalling from core to the UE is needed. This effectively brings the radio access bearer back into 5GC, which unnecessarily increases signalling as well as data and processing loads and delays in such QoS recovery.

Figure 4:
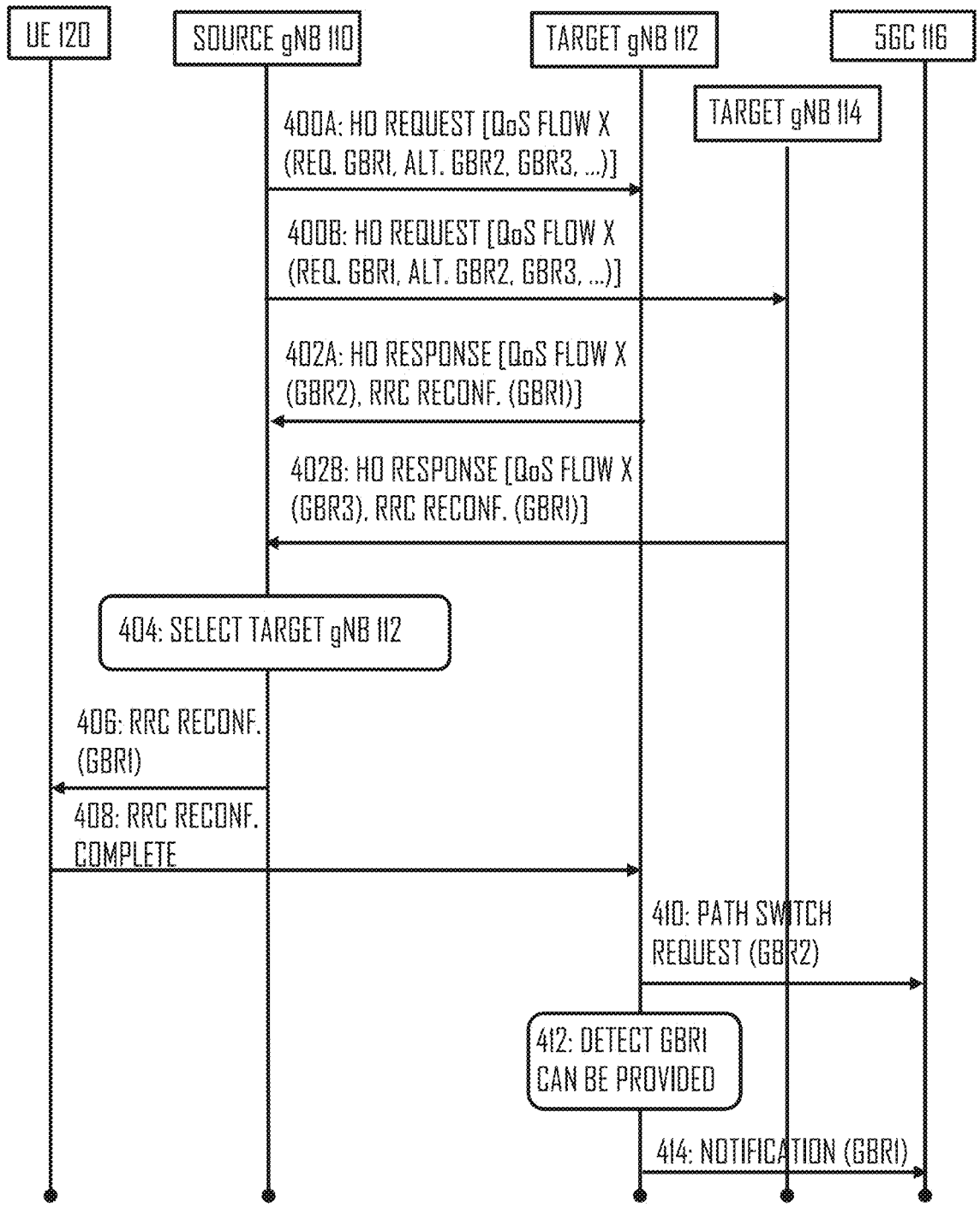
FIGS. 4 and 5 illustrate signalling flow diagrams, according to some embodiments.

Therefore, let us take a look at some embodiments with reference to FIG. 4, which shows a signaling flow diagram for a handover scenario. In an embodiment, the message comprising the requested QoS profile and the one or more alternative QoS profiles is comprised in a handover (HO) request message. Consequently, the indication for configuring the UE 120 based on the requested QoS profile (e.g., the second message) is comprised in a handover acceptance message such as Handover Request Acknowledge message. Such handover may be needed, e.g., when the UE 120 in FIG. 1 moves as depicted with the dotted curved arrow out of cell 100 provide by the gNB 110 to the cell 102 provided by the gNB 112.

In steps 400A and 400B of FIG. 4, the gNB 110 (in this Figure a.k.a. a source NG-RAN node) indicates in a HO request message, for a given QoS flow X, the requested GBR1 value (of a requested QoS profile) and also alternative GBR values (GBR2, GBR3, . . . ) for the alternative QoS profiles to the gNB 112 (in this figure a.k.a. a target NG-RAN node). These messages may be sent together with a "notification control" enabled-flag. As shown in the figure, the source gNB 110 may send similar HO request messages to several target candidate NG-RAN nodes 112, 114, . . . , in order to poll their ability to support the requested GBR and/or the alternative GBR values for this QoS flow X.

In steps 402A, 402B, each target NG-RAN node 112, 114 performs admission control for the QoS flow X. If the target NG-RAN node determines that it can serve for the QoS flow X based on one of the received alternative GBR values and may be able to serve the requested GBR in the future (e.g., depending on radio conditions), the target NG-RAN node 112, 114 accepts the handover and builds a HO response message (e.g., request acknowledge/acceptance message). This message may, as indicated in step 306 of FIG. 3, include the highest GBR value which it can immediately serve (for information to the source NG-RAN node 110). In this example, the gNB 112 indicates it can currently provide GBR2 while the gNB 114 indicates it can currently provide GBR3.

As further implied by step 308 of FIG. 3, the target NG-RAN node 112, 114 may also generate and transmit an RRC reconfiguration information towards the UE 120, via the source RAN node 110. This RRC reconfiguration information may comprise QoS parameters based on the requested QoS profile of the QoS flow X. These parameters may comprise, e.g., LCP parameters (priority, prioritized bit rate, bucket size duration, to mention only a few) of the DRB carrying the QoS flow which are calculated based on the requested GBR and QoS profile, even if the target NG-RAN node 112, 114 can only currently support the GBR of one of the alternative QoS profiles.

In an embodiment, the RRC reconfiguration information is sent only by the gNB 112 which has been selected as the target node, i.e., it may not be sent at step 402A, 402B, but only after the gNB 110 has indicated which candidate target gNB 112, 114 is selected as the target of the handover. Such negotiation is not shown in the figure but is one possible embodiment.

In step 404, the source gNB 110 decides, based on the handover request acknowledge messages 402A, 402B from the candidate target NG-RAN nodes 112, 114, to which of the candidate target NG-RAN nodes 112, 114 the handover is to be performed. It is assumed here that GBR2 is higher than GBR3, and thus the source gNB 110 may select the gNB 112 as the target node for the handover. This may be because the GBR provided by the gNB 112 is closest to the requested GBR, for example.

In step 406, the source gNB 110 may send/transfer/forward the corresponding RRC reconfiguration message built by the target gNB 112 to the UE 120. This message may include the access stratum QoS parameters (e.g., LCP) defined based on the requested QoS profile (e.g., GBR), even if the gNB 112 can only currently support the GBR of one of the alternative QoS profiles at this time. The RRC reconfiguration message may also indicate that the gNB 112 is the one to which the handover is to be made. In step 408, the UE 120 may respond to the selected target node 112. A random access-procedure may take place between the UE 120 and the selected target gNB 112.

In step 410, the target NG-RAN node 112 may indicate in a message, such as a path switch request message, to the 5GC 116 regarding the handover acceptance and the currently served highest GBR value (GBR2 in this example).

After the handover, the target NG-RAN node 112 may have "QoS notification control" feature enabled and try to catch up the requested GBR, as this requested GBR is not served at the time of the handover. In step 412, the gNB 112 may detect that the originally requested QoS profile may now be provided, e.g., due to improved radio conditions. That is, the target NG-RAN node 112 can now serve GBR1 to the UE 120 for the QoS flow X.

In step 414, the gNB 112 may notify the 5GC 116 that current GBR has changed (from GBR2) to GBR1. However, as implied above, no signaling and no RRC reconfiguration of the UE 120 may be needed. Scheduling by/at the target NG-RAN node 112 may change, in order to follow the increased GBR value.

As said, in another embodiment, another one of the alternative QoS profiles is taken into use dynamically during communication, instead of the requested one. In this case, steps 412 and 414 may be replaced by detecting that current alternative GBR is not anymore suitable and that a lower GBR needs to be applied, and informing that to the core 116.

Figure 5:
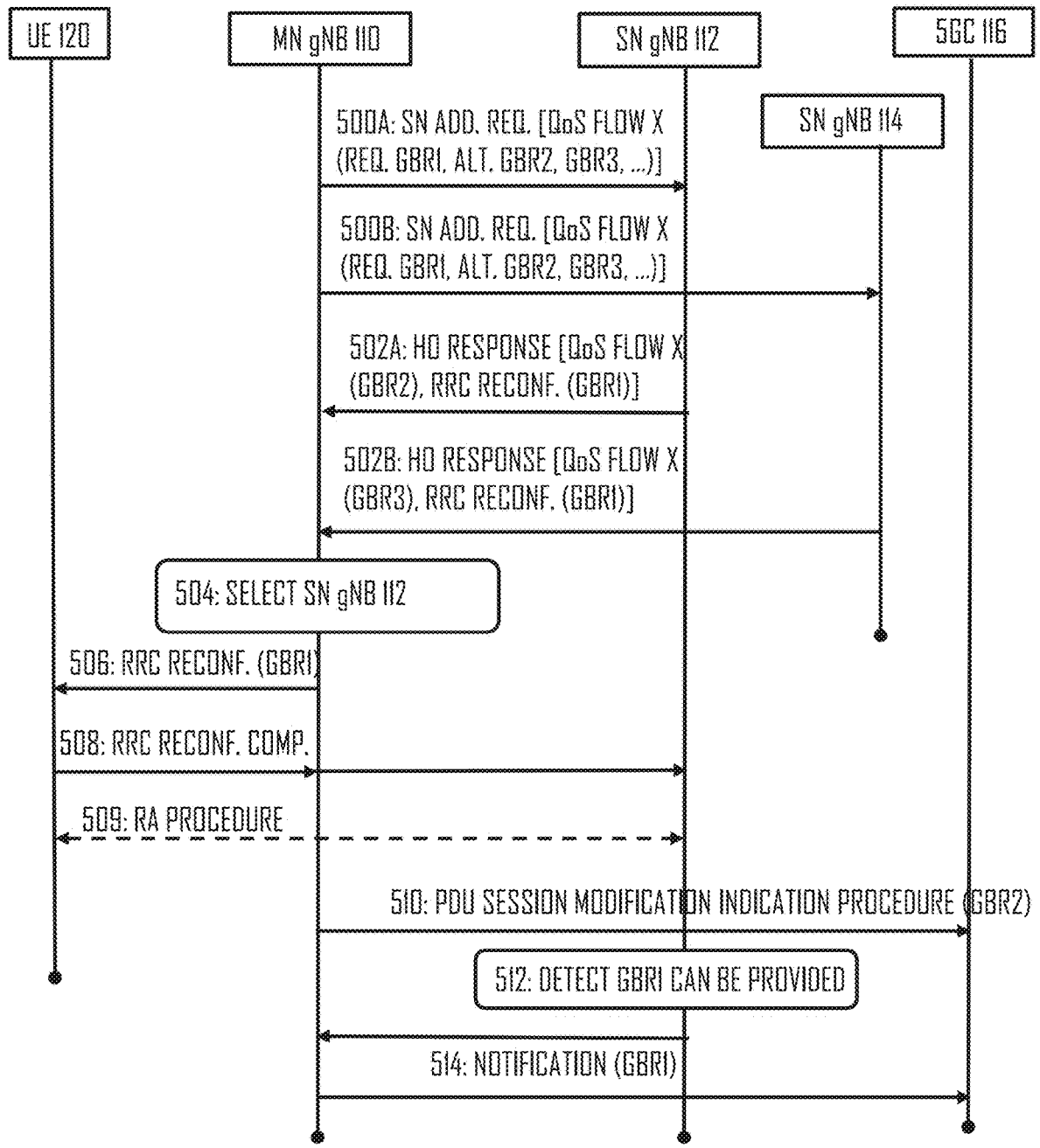

Same or similar principles can be applied for the QoS flow offloading in multi-connectivity scenarios. FIG. 5 depicts a scenario for secondary node (SN) addition. In an embodiment, the message comprising the requested QoS profile and the one or more alternative QoS profiles (e.g., the first message) is comprised in a SN addition request message. Consequently, the indication for configuring the UE 120 based on the requested QoS profile (e.g., the second message) is comprised in a SN addition acceptance message. Such SN addition may take place, e.g., when the UE 120 in FIG. 1 stays in a position in which it is under the coverage of both cells 100 and 102.

In steps 500A and 500B of FIG. 5, the gNB 110 (in this figure a.k.a. a MN) indicates in an SN Addition Request message, for a given QoS flow X, the requested GBR1 value (of a requested QoS profile) and also alternative GBR values (GBR2, GBR3, . . . ) for the alternative QoS profiles to the gNB 112 (in this figure a.k.a. a SN). These messages may be sent together with a "notification control" enabled-flag. As shown in the figure, the source gNB 110 may send similar SN Addition Request messages to several SNs 112, 114, . . . , in order to poll their ability to support the requested GBR and/or the alternative GBR values for this QoS flow X.

In steps 502A, 502B, each SN 112, 114 performs admission control for the QoS flow X. If the SN determines that it can serve for the QoS flow X based on one of the received alternative GBR values and may be able to serve the requested GBR in the future (e.g., depending on radio conditions), the SN 112, 114 accepts the SN addition and builds a response message (e.g., SN addition acknowledge/acceptance message). This message may, as indicated in step 306 of FIG. 3, include the highest GBR value which it can immediately serve (for information to the MN 110). In this example, the gNB 112 indicates it can currently provide GBR2 while the gNB 114 indicates it can currently provide GBR3.

As further implied by step 308 of FIG. 3, the SN 112, 114 may also transmit an RRC reconfiguration information towards the UE 120, via the MN 110. This RRC reconfiguration information may comprise QoS parameters based on the requested QoS profile of the QoS flow X. These parameters may comprise, e.g., access stratum LCP parameters (priority, prioritized bit rate, bucket size duration, to mention only a few) of the DRB carrying the QoS flow based on the requested QoS profile (GBR), even if the SN 112, 114 can only currently support the GBR of one of the alternative QoS profiles.

In an embodiment, the RRC reconfiguration information is sent only by the gNB 112 which has been selected as the SN, i.e., it may not be sent at step 402A, 402B, but only after the gNB 110 has indicated which candidate gNB 112, 114 is selected as the secondary node for the multi-connectivity. Such negotiation is not shown in the figure but is one possible embodiment.

In step 504, the MN 110 decides, based on the SN addition acknowledge messages 502A, 502B from the SNs 112, 114, which of the SNs 112, 114 will be added to the multi-connectivity. It is assumed here that GBR2 is higher than GBR3, and thus the gNB 110 may select the gNB 112 as the SN. This may be because the GBR provided by the gNB 112 is closest to the requested GBR, for example.

In step 506, the gNB 110 may send/transfer/forward the corresponding RRC reconfiguration message to the UE 120 built by the gNB 112. This message may include the access stratum QoS parameters (e.g., LCP) defined based on the requested QoS profile (e.g., GBR), even if the gNB 112 can only currently support the GBR of one of the alternative QoS profiles at this time. The RRC reconfiguration message may also indicate that the gNB 112 is the one which is added as the SN. In steps 508, the UE 120 may respond to the selected SN 112, possibly via the MN 110 or directly. A random access-procedure may in step 509 take place between the UE 120 and the selected gNB 112.

In step 510, the node 110 may indicate in a message, such as in a PDU session modification indication message, towards the 5GC 116 about the SN addition and the currently served highest GBR value (GBR2 in this example).

The node 112 may have "QoS notification control" feature enabled and may try to catch up the requested GBR, as this requested GBR is not served at the time of the SN addition. In step 512, the gNB 112 may detect that the originally requested QoS profile may now be provided, e.g., due to improved resource availability or radio conditions. That is, the node 112 can now serve GBR1 to the UE 120 for the QoS flow X.

In step 514, the gNB 112 may notify the 5GC 116 via the gNB 110 that current GBR has changed (from GBR2) to GBR1. However, as implied above, no signaling and no RRC reconfiguration of the UE 120 may be needed. Scheduling of the node 112 may change, in order to follow the increased GBR value.

As said, in another embodiment, another one of the alternative QoS profiles is taken into use dynamically during communication, instead of the requested one. In this case, steps 512 and 514 may be replaced by detecting that current alternative GBR is not anymore suitable and that a lower GBR needs to be applied, and informing that to the core 116.

Although FIG. 5 is for SN addition, a similar solution may be implemented e.g., for MN initiated SN Modification procedure to an existing SN. Likewise, SN initiated SN modification is also applicable scenario for the proposal.

Given that radio conditions can be rapidly changing, especially for cars in V2X applications or when FR2 is used, these embodiments may enable to adapt rapidly to these radio conditions while avoiding frequent RRC reconfigurations of the UE and avoiding an end-to-end 5GC triggered PDU session modifications.

Moreover, the embodiments may allow to accept the QoS flow at a handover or at an SN addition/modification in a "degraded" mode rather than rejecting it and needing to re-establish it later, when radio improves, which would lead to an interruption and would entail a lot of signalling effort. This may be due to the embodiments where the UE is not configured with QoS profile (and GBR) of the secondary/alternative QoS profiles. The UE is only configured with parameters corresponding to the primary/requested QoS profile.

Figure 6:
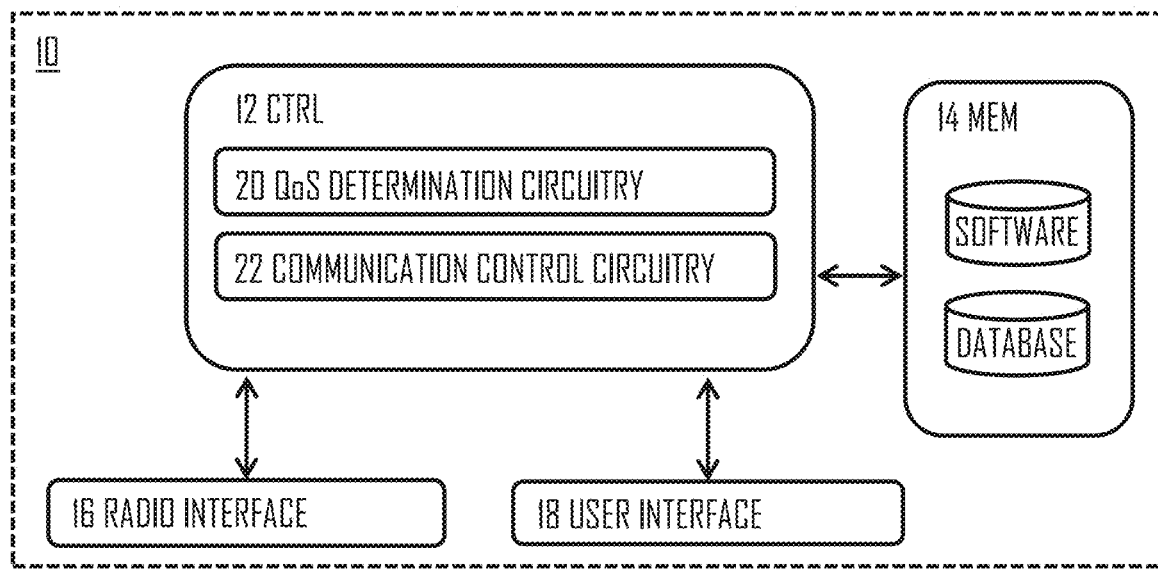
FIG. 6 depicts an apparatus, according to an embodiment.

An embodiment, as shown in FIG. 6, provides an apparatus 10 comprising a control circuitry (CTRL) 12, such as at least one processor, and at least one memory 14 including a computer program code (software), wherein the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 10 may be or be comprised in a network node, such as in gNB/gNB-CU/gNB-DU of 5G. In an embodiment, the apparatus is or is comprised in the network node 112. The apparatus may be caused to execute some of the functionalities of the above described processes.

In an embodiment, a CU-DU (central unit—distributed unit) architecture is implemented. In such case the apparatus 50 may be comprised in a central unit (e.g., a control unit, an edge cloud server, a server) operatively coupled (e.g., via a wireless or wired network) to a distributed unit (e.g., a remote radio head/node). That is, the central unit (e.g., an edge cloud server) and the radio node may be stand-alone apparatuses communicating with each other via a radio path or via a wired connection. Alternatively, they may be in a same entity communicating via a wired connection, etc. The edge cloud or edge cloud server may serve a plurality of radio nodes or radio access networks. In an embodiment, at least some of the described processes may be performed by the central unit. In another embodiment, the apparatus may be instead comprised in the distributed unit, and at least some of the described processes may be performed by the distributed unit. In an embodiment, the execution of at least some of the functionalities of the apparatus 50 may be shared between two physically separate devices (DU and CU) forming one operational entity. Therefore, the apparatus may be seen to depict the operational entity comprising one or more physically separate devices for executing at least some of the described processes. In an embodiment, the apparatus controls the execution of the processes, regardless of the location of the apparatus and regardless of where the processes/functions are carried out.

The apparatus may further comprise communication interface (TRX) 16 comprising hardware and/or software for realizing communication connectivity according to one or more communication protocols. The TRX may provide the apparatus with communication capabilities to access the radio access network, for example. The apparatus may also comprise a user interface 18 comprising, for example, at least one keypad, a microphone, a touch display, a display, a speaker, etc. The user interface may be used to control the apparatus by the user.

The control circuitry 12 may comprise a QoS determination circuitry 20 for determining the QoS profile (e.g., GBR) that can be provided at a given time for certain communication, according to any of the embodiments. The control circuitry 12 may comprise a communication control circuitry 22 for handling connection control and determining communication parameters and resource allocations towards the UE 120, for example, according to any of the embodiments.

Although not shown in figures, an embodiment provides an apparatus comprising a control circuitry (CTRL), such as at least one processor, and at least one memory including a computer program code (software), wherein the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data. In an embodiment, the apparatus may be or be comprised in a network node, such as in gNB/gNB-CU/gNB-DU of 5G. In an embodiment, the apparatus is or is comprised in the network node 110. The apparatus may be caused to execute some of the functionalities of the above described processes. The apparatus may further comprise communication interface (TRX) comprising hardware and/or software for realizing communication connectivity according to one or more communication protocols. The TRX may provide the apparatus with communication capabilities to access the radio access network, for example. The apparatus may also comprise a user interface comprising, for example, at least one keypad, a microphone, a touch display, a display, a speaker, etc. The user interface may be used to control the apparatus by the user. The control circuitry may comprise a QoS determination circuitry for determining the QoS profile (e.g., GBR) that needs to be requested from the gNB 112, for example, according to any of the embodiments. The control circuitry may comprise a communication control circuitry for handling connection control and determining communication parameters and resource allocations towards the UE 120 and the gNB 112, for example, according to any of the embodiments.

Although not shown in figures, an embodiment provides an apparatus comprising a control circuitry (CTRL), such as at least one processor, and at least one memory including a computer program code (software), wherein the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data. In an embodiment, the apparatus may comprise the terminal device of a communication system, e.g., a user terminal (UT), a computer (PC), a laptop, a tabloid computer, a cellular phone, a mobile phone, a communicator, a smart phone, a palm computer, a mobile transportation apparatus (such as a car), a household appliance, or any other communication apparatus, commonly called as UE in the description. In an embodiment, the apparatus is or is comprised in the UE 120. The apparatus may be caused to execute some of the functionalities of the above described processes. The apparatus may further comprise communication interface (TRX) comprising hardware and/or software for realizing communication connectivity according to one or more communication protocols. The TRX may provide the apparatus with communication capabilities to access the radio access network, for example. The apparatus may also comprise a user interface comprising, for example, at least one keypad, a microphone, a touch display, a display, a speaker, etc. The user interface may be used to control the apparatus by the user. The control circuitry may comprise a communication control circuitry for communicating with the network and for setting communication parameters (e.g., LCP) for the communication e.g., based on the received RRC reconfiguration message.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Following is a list of some aspects of the invention.

According to a first aspect, there is provided an apparatus, comprising: at least one processor and at least one memory including a computer program code, wherein the at least one memory and the computer program code are configured, with the at least one processor, to cause an apparatus to perform: control receiving, from a network node, a message comprising a requested quality of service (QoS) profile and one or more alternative QoS profiles, wherein the QoS profiles are associated with a communication with a user equipment; determine that the requested QoS profile cannot be provided by the apparatus for a communication between the apparatus and the user equipment; determine that at least one of the one or more alternative QoS profiles can be provided by the apparatus for a communication between the apparatus and the user equipment; control transmitting, to the network node, an indication that an alternative QoS profile can be provided by the apparatus; control transmitting, to the network node, an indication for configuring the user equipment based on the requested QoS profile; control communication with the user equipment, wherein the communication is at least temporarily based on the alternative QoS profile.

Various embodiments of the first aspect may comprise at least one feature from the following bulleted list:
- the alternative QoS profile is the QoS profile of the one or more alternative QoS profiles which has the highest guaranteed bit rate among those which the apparatus is able to provide.
- the indication for configuring the user equipment comprises QoS parameters defined based on the requested QoS profile.
- transmitting the indication for configuring the user equipment based on the requested QoS profile causes the network node to transfer the indication to the user equipment in a radio resource control configuration message.
- the indications to the network node are comprised in one message.
- determine that the requested QoS profile can be provided by the apparatus for the communication between the apparatus and the user equipment; control changing the communication parameters such that the communication is based on the requested QoS profile.
- determine that the alternative QoS profile cannot anymore be provided by the apparatus for the communication between the apparatus and the user equipment;
- control changing the communication parameters such that the communication is based on another one of the one or more alternative QoS profiles.
- restrain from causing a radio resource control reconfiguration indication to be sent to the user equipment due to the change of the communication parameters.
- the message comprising the requested QoS profile and one or more alternative QoS profiles is comprised in a handover request message or in a secondary node addition message.
- the indication for configuring the user equipment based on the requested QoS profile is comprised in a handover acceptance message or in a secondary node acceptance message.
- control informing a core network about the requested or alternative QoS profile that is to be used for the communication between the apparatus and the user equipment.

According to a second aspect, there is provided a method for a first network node, comprising: receiving, from a second network node, a message comprising a requested quality of service (QoS) profile and one or more alternative QoS profiles, wherein the QoS profiles are associated with a communication with a user equipment; determining that the requested QoS profile cannot be provided by the first network node for a communication between the first network node and the user equipment; determining that at least one of the one or more alternative QoS profiles can be provided by the first network node for a communication between the first network node and the user equipment; transmitting, to the second network node, an indication that an alternative QoS profile can be provided by the first network node; transmitting, to the second network node, an indication for configuring the user equipment based on the requested QoS profile; communicating with the user equipment, wherein the communication is at least temporarily based on the alternative QoS profile. Various embodiments of the second aspect may comprise at least one feature from the following bulleted list under the first aspect:

According to a third aspect, there is provided a computer program product embodied on a distribution medium readable by a computer and comprising program instructions which, when loaded into an apparatus, execute the method according to the second aspect.

According to a fourth aspect, there is provided a computer program product comprising program instructions which, when loaded into an apparatus, execute the method according to the second aspect.

According to a fifth aspect, there is provided an apparatus, comprising means for performing the method according to the second aspect.

According to a sixth aspect, there is provided computer system, comprising: one or more processors; at least one data storage, and one or more computer program instructions to be executed by the one or more processors in association with the at least one data storage for carrying out the method according to the second aspect.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A network node, comprising at least one processor and at least one memory including a computer program code, wherein the at least one memory and the computer program code are configured, with the at least one processor, to cause the network node to:
   control receiving, by the network node from an other network node as part of a process for at least one of a handover of a user equipment, a secondary node addition or a secondary node modification, a message comprising a requested quality of service (QoS) profile and one or more alternative QoS profiles, wherein the QoS profiles are associated with a communication with the user equipment;
   determine, by the network node, that the requested QoS profile cannot currently be provided by the network node for a communication between the network node and the user equipment;
   determine that at least one of the one or more alternative QoS profiles can be provided by the network node for a communication between the network node and the user equipment;
   control transmitting, by the network node to the other network node, a first indication that an alternative QoS profile can be provided by the network node; and
   control transmitting, by the network node to the other network node, a second indication for configuring the user equipment in accordance with at least a portion of the requested QoS profile, even though the network node cannot currently provide the requested QoS profile for the communication between the network node and the user equipment, wherein the second indication for configuring the user equipment includes one or more QoS parameters defined according to the requested QoS profile so as to enable the user equipment to later communicate with the network node, without requiring the network node to send a further configuration message to reconfigure the user equipment when the QoS profile is changed for communicating with the user equipment.

2. The network node of claim 1, wherein the alternative QoS profile is the QoS profile of the one or more alternative QoS profiles which has the highest guaranteed bit rate among those which the network node is able to provide.

3. The network node of claim 1, wherein the second indication for configuring the user equipment comprises a plurality of QoS parameters defined based on the requested QoS profile.

4. The network node of claim 1, wherein the second indication for configuring the user equipment based on the requested QoS profile causes the other network node to transfer the second indication to the user equipment in a radio resource control configuration message.

5. The network node of claim 1, wherein the first and second indications transmitted to the other network node are comprised in one message.

6. The network node of claim 1, wherein the at least one memory and the computer program code are configured, with the at least one processor, to cause the network node to:
   determine, by the network node, that the requested QoS profile can be provided by the network node for the communication between the network node and the user equipment; and
   control changing the communication parameters such that the communication is based on the requested QoS profile.

7. The network node of claim 1, wherein the at least one memory and the computer program code are configured, with the at least one processor, to cause the network node to:
   determine, by the network node, that the alternative QoS profile cannot anymore be provided by the network node for the communication between the network node and the user equipment; and
   control changing the communication parameters such that the communication is based on another one of the one or more alternative QoS profiles.

8. The network node of claim 6, wherein the at least one memory and the computer program code are configured, with the at least one processor, to cause the network node to:
   restrain, by the network node, from causing a radio resource control reconfiguration indication to be sent to the user equipment due to the change of the communication parameters.

9. The network node of claim 1, wherein the message comprising the requested QoS profile and one or more alternative QoS profiles is comprised in a handover request message or in a secondary node addition message.

10. The network node of claim 1, wherein the second indication for configuring the user equipment based on the requested QoS profile is comprised in a handover acceptance message or in a secondary node acceptance message.

11. The network node of claim 1, wherein the at least one memory and the computer program code are configured, with the at least one processor, to cause the network node to:
control informing, by the network node, a core network about the requested or alternative QoS profile that is to be used for the communication between the network node and the user equipment.

12. The network node of claim 1, wherein the at least one memory and the computer program code are configured, with the at least one processor, to cause the network node to:
control communicating, by the network node, with the user equipment, wherein the communicating is at least temporarily based on the alternative QoS profile.

13. A method at a network node, comprising:
receiving, by the network node from an other network node as part of a process for at least one of a handover of a user equipment, a secondary node addition or a secondary node modification, a message comprising a requested quality of service (QoS) profile and one or more alternative QoS profiles, wherein the QoS profiles are associated with a communication with the user equipment;
determining, by the network node, that the requested QoS profile cannot currently be provided by the network node for a communication between the network node and the user equipment;
determining, by the network node, that at least one of the one or more alternative QoS profiles can be provided by the network node for a communication between the network node and the user equipment;
transmitting, by the network node to the other network node, a first indication that an alternative QoS profile can be provided by the network node; and
transmitting, by the network node to the other network node, a second indication for configuring the user equipment in accordance with at least a portion of the requested QoS profile, even though the network node cannot currently provide the requested QoS profile for the communication between the network node and the user equipment, wherein the second indication for configuring the user equipment includes one or more QoS parameters defined according to the requested QoS profile so as to enable the user equipment to later communicate with the network node, without requiring the network node to send a further configuration message to reconfigure the user equipment when the QoS profile is changed for communicating with the user equipment.

14. The method of claim 13, wherein the second indication for configuring the user equipment comprises QoS parameters defined based on the requested QoS profile.

15. The method of claim 13, the method further comprising:
determining, by the network node, that the requested QoS profile can be provided by the network node for the communication between the network node and the user equipment;
changing, by the network node, the communication parameters such that the communication is based on the requested QoS profile.

16. The method of claim 13, the method further comprising:
determining, by the network node, that the alternative QoS profile cannot anymore be provided by the network node for the communication between the network node and the user equipment;
changing, by the network node, the communication parameters such that the communication is based on another one of the one or more alternative QoS profiles.

17. The method of claim 13, the method further comprising:
restraining, by the network node, from causing a radio resource control reconfiguration indication to be sent to the user equipment due to the change of the communication parameters.

18. The method of claim 13, wherein the message comprising the requested QoS profile and one or more alternative QoS profiles is comprised in a handover request message or in a secondary node addition message, and wherein the second indication for configuring the user equipment based on the requested QoS profile is comprised in a handover acceptance message or in a secondary node acceptance message.

19. The method of claim 13, the method further comprising:
informing, by the network node, a core network about the requested or alternative QoS profile that is to be used for the communication between the network node and the user equipment.

20. A non-transitory computer-readable storage medium comprising instructions stored thereon that, when executed by at least one processor, are configured to cause a network node to:
control receiving, by the network node from an other network node as part of a process for at least one of a handover of a user equipment, a secondary node addition or a secondary node modification, a message comprising a requested quality of service (QoS) profile and one or more alternative QoS profiles, wherein the QoS profiles are associated with a communication with the user equipment;
determine, by the network node, that the requested QoS profile cannot currently be provided by the network node for a communication between the network node and the user equipment;
determine, by the network node, that at least one of the one or more alternative QoS profiles can be provided by the network node for a communication between the network node and the user equipment;
control transmitting, by the network node to the other network node, a first indication that an alternative QoS profile can be provided by the network node; and
control transmitting, by the network node to the other network node, a second indication for configuring the user equipment in accordance with at least a portion of the requested QoS profile, even though the network node cannot currently provide the requested QoS profile for the communication between the network node and the user equipment, wherein the second indication for configuring the user equipment includes one or more QoS parameters defined according to the requested QoS profile so as to enable the user equipment to later communicate with the network node, without requiring the network node to send a further configuration message to reconfigure the user equipment when the QoS profile is changed for communicating with the user equipment.

* * * * *